US005961582A

United States Patent [19]
Gaines

[11] Patent Number: 5,961,582
[45] Date of Patent: Oct. 5, 1999

[54] DISTRIBUTED AND PORTABLE EXECUTION ENVIRONMENT

[75] Inventor: R. Stockton Gaines, Pacific Palisades, Calif.

[73] Assignee: Acorn Technologies, Inc., Pacific Palisades, Calif.

[21] Appl. No.: 08/330,622

[22] Filed: Oct. 25, 1994

[51] Int. Cl.$^6$ ......................................................... G06F 9/46
[52] U.S. Cl. .............................................. 709/1; 709/302
[58] Field of Search ..................................... 395/650, 406, 395/700, 680, 682, 406 R, 676, 677, 678; 709/300, 106, 107, 1, 108, 302

[56] References Cited

U.S. PATENT DOCUMENTS

| | | | |
|---|---|---|---|
| 4,669,043 | 5/1987 | Kaplinsky ..................................... | 711/3 |
| 4,677,546 | 6/1987 | Freeman et al. ......................... | 711/203 |
| 4,974,159 | 11/1990 | Hargrove et al. ........................ | 395/527 |
| 5,088,031 | 2/1992 | Takasaki et al. ......................... | 395/400 |
| 5,113,522 | 5/1992 | Dinwiddie, Jr. et al. ............... | 395/553 |
| 5,241,673 | 8/1993 | Schelvis .................................... | 395/600 |
| 5,315,711 | 5/1994 | Barone et al. ............................ | 395/275 |
| 5,519,867 | 5/1996 | Moeller et al. ........................... | 395/677 |
| 5,701,502 | 12/1997 | Baker et al. .............................. | 395/500 |

OTHER PUBLICATIONS

Golub et al., "Unix as an Application Program", USENIX Summer Conference, pp. 87–95, Jun. 1990.

Parmelee, T. I., et al., "Virtual storage and virtual machine concepts", IBM Systems Journal, No. 2, pp. 99–130, 1972.

Prosise, Jeff, "Windows Multitasking," PC Magazine, pp. 261, 262, & 264, May 1994.

Muller, Klaus, Andrew Schulman, "Undocumented Corner—Think Globally, Act Locally: Inside the Windows Instance Data Manager," Dr. Dobb's Journal, pp(18), Apr. 1994.

Olson, Douglas, K., "Developing for Multiple Platforms: Businesses expect software to run on Macintosh, DOS, Windows, and Unix. Moving an application to another platform is a daunting task that can change a developer's approach to writing software," BYTE, Feb. 1994.

Leinfuss, Emily, "Portability priorities drive developer picks," Software Magazine, v13, n15, p103(5), Nov. 1993.

(List continued on next page.)

*Primary Examiner*—Alvin E. Oberley
*Assistant Examiner*—St. John Courtenay, III
*Attorney, Agent, or Firm*—Law Offices of Steven A. Swernofsky

[57] ABSTRACT

A method and system for providing access to resources at a host computer to a remote user, without requiring the remote user to have detailed knowledge of the host computer. The system includes a host virtual operating system, resident on a host computer and having a set of resources including process control, a file system, interprocess communications, and a set of device interfaces, overlaid on and distinguished from the host computer's actual resources. The virtual host is capable of executing programs in a standardized programming language, to provide the ability to run programs that are host-independent. The virtual host is capable of limiting access to the host computer's actual resources. The system also includes a front-end invoked by the remote user. A server program at the host computer receives requests from a client program run by the remote user, and provides the virtual host operating system at the host computer. The server program includes an interpreter for the (interpreted) programming language, a process control subsystem, and a virtual file subsystem. The programming language includes a set of primitive commands for invoking the primitive operations of the process control subsystem, including interprocess communication primitive operations, and a set of primitive commands for invoking the primitive operations of the virtual file subsystem. The process control subsystem and the virtual file subsystem translate those primitive operations into a set of primitive operations provided by the host computer, and call upon those primitive operations provided by the host computer.

7 Claims, 3 Drawing Sheets

OTHER PUBLICATIONS

McNierney, Ed, 386 operating environments, PC Tech Journal, v6, n1, p60(11), Jan. 1988.

By B. Clifford Neuman and Theodore Ts'o, Kerberos: An Authentication Service for Computer Networks, IEEE Communications Magazine, Sep. 1994, pp. 33 through 38.

By B. Clifford Neuman, Prospero: A Toll for Organizing Internet Resources, Electronic Networking: Research, Applications, and Policy, 2(1), Spring 1992, pp. 1 through 8.

By Nathaniel Borenstein, Bellcore Marshall T. Rose, Dover Beach Consulting, Inc., MIME Extensions for Mail–Enabled Applications: application/Safe–Tcl and multipart/enabled–mail, Memo dated Nov., 1993, pp. 1 through 24.

By Nick Vasilatos—Concurrent Computer Corporation, Partitioned Multiprocessors and The Coexistence of Heterogeneous Operating Systems, USENIX—Winter '91—Dallas, TX, pp. 23 through 32.

By L. W. McVoy, S. R. Kleiman—Sun Microsystems, Inc., Extent–like Performance from a UNIX File System, Abstract, USENIX—Winter '91—Dallas, TX, p. 33.

By Carl Staelin, Hector Garcia–Molina—Princeton University, Smart Filesystems, Abstract, Winter '91—Dallas, TX, pp. 45 through 51.

By R. Stockton Gaines, The Rand Corporation, Santa Monica, California, Control of Processes in Operating Systems: The Boss–Slave Relation, Nov. 1975, pp. 1 through 13.

By Robert H. Thomas, Bolt Beranek and Newman Inc., Cambridge, Massachussetts, JSYS Traps, A TENEX mechanism for encapsulation of user processes, National Computer Conference 1975, pp. 351 through 360.

By David Golub, Randall Dean, Alessandro Forin, Richard Rashid—School of Computer Science; Carnegie Mellon University, Unix as an Application Program, USENIX Summer Conference Jun. 11–15, 1990, pp. 87 through 95.

By R. P. Parmelee, T. I. Peterson, C. C. Tillman, and D. J. Hatfield, Virtual storage and virtual machine concepts, 1972, pp. 99 through 130.

DISTRIBUTED AND PORTABLE EXECUTION ENVIRONMENT

BACKGROUND OF THE INVENTION

1. Field of the Invention

This invention relates to a distributed and portable execution environment.

2. Description of Related Art

A first aspect of the invention relates to using a host computer from a remote computer.

It has become common to couple computers together in networks, so that resources at a host computer on the network is accessible by a user remote to the host computer but with access to another computer on the network. It has further become common for networks of computers to be coupled together into a common network of networks, sometimes called an "internet". Computers coupled to an internet may also have a variety of differing hardware or software architectures, such as processor types or operating systems. Remote users with access to a computer would generally like to access resources on host computers without having to issue explicit commands for communication between computers or for translation between software constructs used on different computers.

One method of the prior art has been to provide explicit protocols for communication between computers and for accessing resources between computers. These protocols have included "Telnet", for providing a communication path and login session at a host computer to a remote user, "FTP" (file transfer protocol), for providing transfer of file objects to or from a remote computer, and electronic mail, for transferring messages between users at different computers.

While this method achieves the general goal of making resources available between computers, it has the drawback that the narrow scope of operation of these protocols has made sharing resources between computers more unwieldy than desirable. This method also has the further drawback that users attempting to access resources at a remote computer must generally have a good idea of the nature and structure of those resources, such as having detailed knowledge about the operating system of the remote computer.

Another method of the prior art has been to provide an electronic mail protocol, sometimes called "active mail" or "MIME", that allows the mail itself to execute a program when read by the recipient. While this method of the prior art achieves the general goal of executing a program at a host computer from a remote computer, it has the drawback that execution of the program (including when the program is executed and what resources it is allowed to access) is not under control of the sender. Moreover, the concept of active mail provides for only a very few types of operations that may be executed at a host computer, and only those that might be appropriate for electronic mail messages.

Another method of the prior art has been to provide software for remote access to specific data structures on host computers, such as menus or hypertext documents. These documents have included "Gopher" menus, for directing users to documents and to further gopher menus, and "HTML" (hypertext markup language) documents, for directing users to other documents in a variety of formats, generally available by means of programs such as "Mosaic". One version of this method, implemented for the "Prospero" system, has been to provide a virtual file system, overlaid on the actual file system of the host computer, that a remote user may access using software provided for that purpose. The Prospero system is further described in B. Clifford Newman, "Prospero: A Tool for Organizing Internet Resources", Electronic Networking: Research, Applications, and Policy, 2(1) (Spring 1992), hereby incorporated by reference, and is available by inquiry from the authors of that article, or on the Internet. While this method appears to achieve the general goal of making remote access to resources more convenient, it has the drawback that access is generally limited to specific data structures or specific types of data structures, and primarily to those data structures that have been set up in the necessary format for remote access.

The prior art has been particularly unsuccessful at providing convenient access to the processing power of a host computer by remote users. For example, the "Telnet" protocol achieves the purpose of providing a method for remote users to create, transfer and run programs, but has the drawback that those remote users must generally alter the programs to account for differences between computers. Documents in the "Gopher" and "HTML" format do not provide remote access to programs or programming capability, except sometimes in the limited sense of viewing picture files or performing text searches on a preselected database, and then only if the recipient has preset the document for that purpose. Moreover, any protocol for providing the processing power of a host computer should also provide for control at the host computer of the amount of resources and the activities permitted to a remote user.

Another method of the prior art has been to provide a "network" operating system that makes a network of computers appear to a user as a single computer system. Such network operating systems have included the "National Software Works" project, and many local network operating system products. While this method appears to achieve the general goal of making remote access to resources more convenient, it has the drawback that access is generally limited to data structures, rather than to the processing capability or other resources of the host computer. Where access has been provided to processing capability or other resources, it has been on a very limited basis, such as the ability to run specific programs that have been predetermined by the network operating system.

Accordingly, it would be advantageous to provide a method by which remote users having access to a computer could access the full set of resources at a host computer, without having to have a good idea of the nature and structure of those resources, such as having detailed knowledge about the operating system of the host computer. Such a full set of resources should advantageously include the processing power of the host computer, as applied to new computer programs selected or created by the remote user.

A second aspect of the invention relates to providing a portable virtual operating system.

It has become common for computers to be provided with a set of disparate hardware and software, with the result that different computers often have widely varying execution environments. Programs written for one execution environment often are unable to execute in a different execution environment, or may execute with only reduced functionality. It has therefore become common for distributors of programs to provide several variations on essentially the same program, with each variation tailored for a different execution environment.

One method of the prior art has been to provide higher level programming languages for programming. Thus, instead of programming in the machine language of a target set of hardware, the programmer may program in a language that is translated into that machine language for execution. The "machine language" comprises actual binary instructions that are executed by the hardware, and is sometimes referred to today as a "binary executable".

According to this method, assembly languages were developed, that provided a symbolic representation of the machine language and were transliterated into machine language. A translator from the assembly language to the machine language was then required. Some assembly languages also provided extensive macro capabilities. Assembly languages had the advantage that they could be programmed symbolically, and without reference to the actual time or location the program was loaded into memory. However, assembly languages have the drawback that they are directed at only a single target set of hardware.

Compiled languages were developed after assembly languages. Examples include "FORTRAN", "COBOL", and "PL/I". A compiler from the compiled language was then required, sometimes from the compiled language into an assembly language, and sometimes from the compiled language directly into the machine language. Some compiled languages also provided extensive preprocessor capabilities. Compiled languages had the advantage that they could be programmed in a syntax other than the machine language, in constructs more natural the human programmer, and without reference to the actual machine instructions the program would execute. However, it quickly developed that any program other than a very simple one would depend upon aspects of the operating system and thus would be directed at only a few target operating systems.

In contrast, interpreted languages provide an environment in which the program may execute. An interpreter of the interpreted language was then required, the interpreter being a program that is executed by the hardware and controlled by the operating system software of the host computer. The interpreter analyses the statements of the program to be interpreted and simulates their execution in the environment provided by the interpreter.

Interpreted languages have an advantage over compiled languages, in that the interpreter scrutinize the actions of the program being interpreted, and may make runtime checks on those actions to assure they meet criteria of acceptability. For example, if the program attempts to violate security requirements, or to use too much memory space or processor time, or to use prohibited features of the hardware, the interpreter may refuse to perform those actions and may issue an error. However, it was found that interpreted languages had the drawback of being generally slower than compiled languages, and so interpreted languages have generally been eschewed for operating system software.

Another method of the prior art has been to provide a "virtual machine" for execution of the program. The virtual machine provides a layer of software, typically part of the operating system software, that simulates a computer that has been reserved for execution of the specific program. Sometimes the virtual machine is augmented by calls to services provided by the operating system, such as memory management. However, the virtual machines provided in the prior art generally were directly mapped onto the hardware of the real machine on which the program was executing. Thus, the program to be executed on the virtual machine was still required to be tailored for that particular hardware and the services provided by the particular operating system software.

Accordingly, it would be advantageous to provide a virtual execution environment for which programs could be written that are capable of execution on different computer hardware and with different operating systems.

SUMMARY OF THE INVENTION

The invention provides a method and system for providing access to a set of resources at a host computer to a remote user, without requiring the remote user to have detailed knowledge of the host computer. In a preferred embodiment, the system includes a host virtual operating system, resident on a host computer and having a set of resources including process control, a file system, interprocess communications, and a set of device interfaces, overlaid on and distinguished from the host computer's actual resources. The virtual operating system is capable of executing programs in a standardized programming language, which may be either an interpreted or compiled language, to provide th remote user with the ability to run programs that are host-independent. The virtual operating system is capable of limitin access to the host computer's actual resources, such as processor time, files, and devices. The system also includes a user interface invoked by the remote user, preferably having a graphical user interface.

In a preferred embodiment, a server program at the host computer receives requests from a client program run by the remote user, and provides the virtual host operating system at the host computer. The server program includes an interpreter for the (interpreted) programming language, a process control subsystem, and a virtual file subsystem. The programming language includes a set of primitive commands for invoking the primitive operations of the process control subsystem, including interprocess communication primitive operations, and a set of primitive commands for invoking the primitive operations of the virtual file subsystem. The process control subsystem and the virtual file subsystem translate those primitive operations into a set of primitive operations provided by the host computer, and call upon those primitive operations provided by the host computer after checking that they do not violate any security constraints.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose computers operating under program control, and that modification of such general purpose computers to implement the process steps and data structures described herein would not require undue invention.

THE HOST VIRTUAL OPERATING SYSTEM

Figure 1:
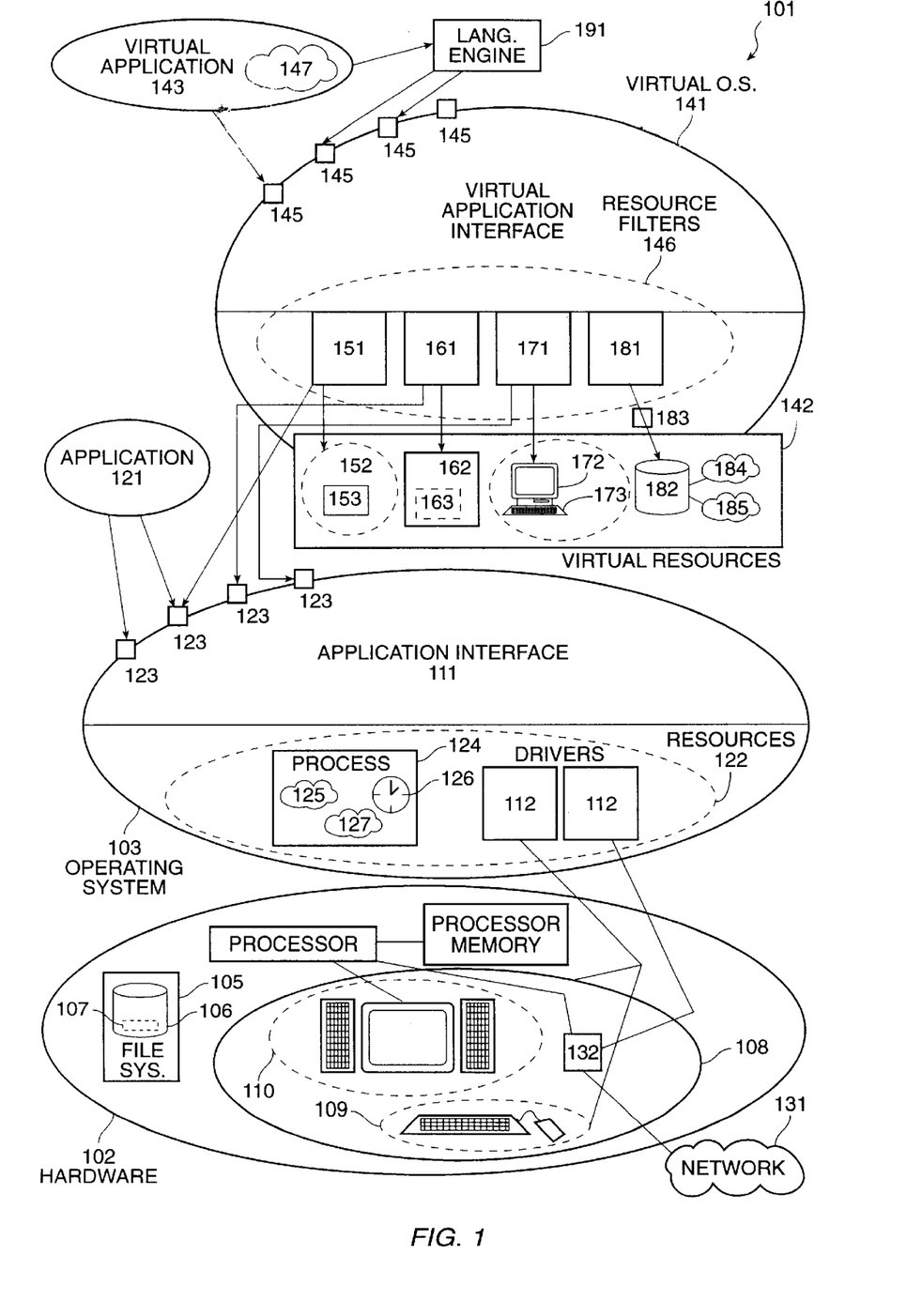
FIG. 1 is a block diagram showing a host virtual operating system with a host computer.

FIG. 1 is a block diagram showing a host virtual operating system with a host computer.

As shown herein, the host virtual operating system comprises software that is layered between a program to be executed and the operating system software of the computer on which the program is to be executed. For example, the host computer may comprise an IBM-compatible PC, a DEC Alpha, a Sun Workstation, an Apple Macintosh, or some other computer system. The operating system that executes on that host computer may comprise a variant of UNIX, DOS (from Microsoft, IBM, and others), VMS (from Digital Equipment Corp.), MVS (from IBM), or System 7 (from Apple Computer). The host virtual operating system may be programmed for any of these hardware and operating system software, and provides a relatively uniform environment in which the program executes.

As shown herein, the host virtual operating system may provide its services to compiled programs and to interpreted programs. The host virtual operating system provides a safe environment for program execution, in that the owner or administrator of the host computer may use the virtual operating system to assure that the program to be executed is constrained. The program is not allowed to make unchecked requests to read, write, or modify real files provided by the host computer's operating system software, to use critical hardware of the host computer, or to use arbitrary amounts of memory space or processor time.

An element of the host virtual operating system is the provision of a virtual file system, preferably using the Prospero file system. A hierarchical file system is provided, but which is not necessarily mapped one-to-one onto the file system of the host computer. For example, where the host computer's operating system provides a hierarchical "real" file system with directories and files, a virtual file system may be provided dependent from a selected directory in that real file system.

A host computer 101 comprises a set of computer hardware 102, controlled by an operating system 103. The computer hardware 102 comprises at least one processor 104 including processor memory, a file system 105 comprising a storage medium 106 having a set of files or other file system objects 107 thereon organized in a file system 105 name space, and may comprise one or more devices 108 coupled to the processor, such as a keyboard or mouse or another input device 109 and a monitor or printer or another output device 110. The operating system 103 comprises software executing on at least one processor 104 for controlling the resources of the host computer 101. The operating system 103 includes an application interface 111, and typically includes a set of device drivers 112 for controlling the devices 108.

The host computer 101 executes one or more application programs 121, which have been created or programmed by users and which call upon the application interface 111 for services from the operating system 103. The operating system 103 controls a set of resources 122 of the host computer 101 that it presents to the application program 121 by means of the application interface 111, possibly including access to drivers 112 and their devices 108. The application interface 111 comprises a set of entry points 123 that the application program 121 invokes to cause the application interface 111 and the operating system 103 to be executed.

Typically, these resources 122 include a set of processes 124, access to the file system 105 or a part thereof, and access to one or more devices 108. Each process 124 has its own protected address space 125 and its own allotment of processor time 126, and processes 124 have access to a means for interprocess communication for communicating with each other. Each process 124 may also be assigned a set of access capabilities or permissions 127 which may be required by the operating system 103 for access to the file system 105 or to devices 108.

When the host computer 101 is coupled to a network 131, at least one device 108 comprises a network interface 132 for communication with the network 131, and the operating system comprises at least one device driver 112 for controlling the network interface 132 and exchanging messages 133 thereto and therefrom. The host computer 101 may implement one or more network protocols using these messages 133. Typically these protocols include a protocol such as the "Telnet" protocol for communication with another computer 101 including sending and receiving messages 133 between two computers 101, and a protocol such as the "FTP" protocol for transferring blocks of data between two computers 101 including sending or receiving files or other file system objects 107.

A host virtual operating system 141 comprises an application program 121 for controlling a set of virtual resources 142 of the host computer 101. The virtual operating system 103 acts for the virtual resources 142 and a set of virtual applications 143 similarly to the way the operating system 103 acts for the actual resources 122 of the host computer 101 and the set of application programs 121. The virtual operating system 141 includes a virtual application interface 144, having its own set of entry points 145, for the virtual applications 143 to call upon for services from the virtual operating system 141. The virtual application interface 144 comprises a set of resource filters 146 for requesting access to the resources of host computer 101 from the application interface 111 of the operating system 103.

The resource filters 146 scrutinize each request for virtual resources 142 from virtual applications 143 for any violation of a set of virtual permissions 147 enforced by the virtual operating system 141, and for any attempted violation of the actual permissions 127 for the virtual operating system 141 enforced by the operating system 103. The resource filters 146 also translate each request (by means of the virtual application interface 144) for virtual resources 142 into one or more requests (by means of the application interface 111) for actual resources 122.

The resource filters 146 include a process control filter 151 for controlling access to the resources 122 of the host computer 101 for process control, including the set of processes 124 and the set of actions the operating system 103 permits with regard to processes 124. Typically, these actions include creating and destroying processes 124, modifying the address space 125, the allotment of processor time 126, or the permissions 127 assigned to a process 124, and interprocess communication.

The process control filter 151 implements a virtual process model 152 comprising a set of virtual processes 153 organized in a virtual process model 152 name space. The virtual process model 152 includes a set of actual processes 124 that the virtual operating system 141 has permissions 127 to access. The process control filter 151 uses actual processes 124 to model and present the virtual processes 153 in the virtual process model 152. For example, the process control filter 151 might request the operation system 103 to create or allocate processes 124 when the virtual application 143 requests the virtual operating system 141 to create a virtual process 153.

The process control filter 151 scrutinizes a request for service to determine if the virtual application 143 requesting service has virtual permissions 147 to access to affect the virtual process 153 it seeks to access. After determining that access should be allowed, the process control filter 151 translates the request for service into one or more direct calls on the application interface 111, requesting a like service from the operating system 103. If the requested service attempts to violate the permissions 127 held by the virtual operating system 141 itself, the process control filter 151 may refuse to perform the service, or may rely on the operating system 103 to refuse to perform the service and to generate an error that the process control filter 151 returns to the virtual application 143.

In a preferred embodiment, the process control filter 151 provides interprocess communication between any two virtual applications 143, whether they are executing on the same host computer 101 or on different host computers 101. To perform interprocess communication between a virtual application 143 on a first host computer 101 and on a second host computer 101, the process control filter 151 may transmit a virtual application 143 to execute on the second host computer 101 (as shown herein with regard to FIGS. 2 and 3), and perform interprocess communication between the two virtual applications 143 on the second host computer 101. In a preferred embodiment, the process control filter 151 also provides interprocess communication between a virtual application 143 and a real application 121, or between two virtual applications 143 executing under control of separate instances of the virtual operating system 141.

The resource filters 146 include a file system filter 161 for controlling access to the resources 122 of the host computer 101 relating to the file system 105, including the set of actions the actions the operating system 103 permits with regard to the file system 105 (such as manipulating files, directories, and other file system objects 107 such as i-nodes or links). Typically, these actions include creating and destroying files or other file system objects 107 and modifying files or other file system objects 107 to affect the organization of the file system 105. In a preferred embodiment, the file system filter 161 has functionality similar to the Prospero file system.

In a preferred embodiment, the file system filter 161 implements a virtual file system 162 comprising a set of virtual files (or virtual file system objects) 163 organized in a virtual file system 162 name space. The virtual file system 162 includes a part of the file system 105 including a set of files or file system objects 107 that the virtual operating system 141 has permissions 127 to access. The file system filter 161 uses at least part of the file system 105 it has permissions 127 to access to model and present the virtual files 163 in the virtual file system 162.

Some of the virtual files 163 may correspond to actual files or file system objects 107; requests for services that affect these virtual files 163 are implemented by direct changes to the actual files or file system objects 107. The file system filter 161 scrutinizes a request for service requiring access to one of these virtual files 163 to determine if the virtual application 143 requesting service has virtual permissions 147 to access the virtual file 163. After determining that access should be allowed, the file system filter 161 translates the request for service into one or more direct calls on the application interface 111, requesting a like service from the operating system 103. If the requested service attempts to violate the permissions 127 held by the virtual operating system 141 itself, the file system filter 161 may refuse to perform the service, or may rely on the operating system 103 to refuse to perform the service and to generate an error that the file system filter 161 returns to the virtual application 143.

Some of the virtual files 163 do not correspond to actual files or file system objects 107, but are instead modeled using actual files or file system objects 107 that the virtual application 143 is not otherwise allowed to access. The file system filter 161 scrutinizes a request for service requiring access to one of these virtual files 163 to determine if the virtual application 143 requesting access has virtual permissions 147 to access the virtual file 163, but need not determine if the requested access would attempt to violate the permissions 127 held by the virtual operating system 141. After determining that access should be allowed, the file system filter 161 translates the request for service into a set of requests for service from the operating system 103, the net effect of which is to implement the model of the virtual file system 162 presented to the virtual application 143.

Typically, the host computer 101 comprises a hierarchical file system 105, with files or other file system objects 107 organized in a tree-structured name space. Hierarchical file systems are known in the art of operating systems. The file system filter 161 may mirror a part of the name space and thereby allow access by virtual applications 143 to that part of the file system 105. The file system filter 161 reserves a part of the name space, such as a selected directory and its subdirectories, or even a single actual file, for modeling and implementing the virtual file system 162. Each virtual file 163 (such as a data file or a directory) created by a virtual application 143 may be implemented using one or more actual files or file system objects 107.

The virtual resources 142 need not correspond directly to the actual resources 122 of the host computer 101, and may be composed of more complex structures of actual resources 122. The resource filter 146 for these complex virtual resources 142 translates requests for services from the virtual operating system 141 (by means of the virtual application interface 144) into one or more requests for services from the operating system 103 (by means of the application interface 111) for the simpler actual resources 122 of the host computer 101.

The resource filters 146 include a GUI filter 171 for controlling access to a graphical user interface. The GUI filte 171 translates requests to input from a virtual input device 172, such as a keyboard or mouse or another input device, and output to a virtual output device 173, such as a monitor or printer or another output device.

In a preferred embodiment, the GUI filter 171 provides a set of services for input from the virtual input device 172 and services for output to the virtual output device 173 that mirror those services generally available on graphical user interfaces for known operating systems. The GUI filter 171 provides services for creating a window for output, for overlapping that window in back of or in front of other windows, and for moving that window to selected locations on a display screen. The GUI filter 171 also provides services for reading characters typed by a user, for locating spots pointed to by a pointing device. For example, the GUI filter 171 may provide support for output display Postscript, possibly modified so that display Postscript programs are constrained in the same manner as virtual applications 143. The virtual application 143 may thus provide a graphical interface that users are familiar with, without the programming having to take account of a wide variety of methods for providing such an interface used by different operating systems.

The resource filters 146 include a database filter 181 for controlling access to a database 182 (such as an SQL database) accessible by the host computer 101. The database 182 may be located on the storage medium 106 in the file system 105, or may be accessible by the host computer 101 by means of the network interface 132. The database filter 181 receives requests for access to the database 182 in the form of a set of database commands 183 in a database access language (such as SQL language statements in the SQL language). The language SQL is known in the art of database access. The database filter 181 scrutinizes the database commands 183 for validity, and having determined they are valid, translates the database commands 183 into a set of requests to the application interface 111 of the operating system 103 to accomplish their semantics. Typically, the requests to the application interface 111 will involve requests for access to the file system 105.

The database filter 181 similarly allows access to a database schema 184 for the database 182, in the case of a relational database comprising a set of names for tables and for columns within tables, and to a data dictionary 185 for the database 182, in the case of a relational database comprising a set of detailed information about elements of the database 182. In a preferred embodiment, the database filter 181 restricts access to views of the database 182 by restricting access to parts of the database schema 184 and data dictionary 185. For example, the database filter 181 may provide a mapping between virtual table names and the actual table names of the underlying database 182. In a preferred embodiment, the database filter 181 may also restrict access to only a subset of the database 182. For example, a database 182 at a university may include personal information about faculty, students, and staff, but the database filter 181 may restrict access merely to names, addresses, and telephone numbers.

The virtual operating system 141 also comprises a language engine 191 that receives statements in a selected programming language and translates those statements into executable actions on the host computer 101. In a preferred embodiment, the language engine 191 comprises an interpreter for the programming language; in an alternative embodiment, the language engine 191 may comprise a compiler, or the interpreter may comprise means for compiling all or part of a program in the selected programming language.

In a preferred embodiment, the selected programming language is a modified version of one of the following languages: Perl, Python, Rexx, Tcl, Visual Basic, or other programming languages that are suited for interpreters or compilers. These programming languages are known in the art of computer science and are generally available.

These particular programming languages combine traditional programming language constructs with additional capabilities such as found in command shells. However, this is not specifically required for the programming language, which may generally be any programming language, such as a Lisp environment.

The modified version of the selected programming language has any operations that could violate access permissions (such as direct operation on the file system 105 of the host computer 101) replaced with calls for service from the virtual operating system 141, such as calls on the virtual application interface 145. The language engine 191 thus directs such requests to the virtual operating system 141, which enforces any constraints the owner or administrator of the host computer 101 imposes.

In a preferred embodiment, the programming language interpreted by the language engine 191 is Python or Tcl, and is integrated with Prospero as the virtual file system 162 and with the Tk graphical interface. In a preferred embodiment, the virtual operating system 141 and executes under control of the HPUX or Sun OS operating systems 103. A preferred embodiment integrates the PVM environment as well.

USING THE HOST VIRTUAL OPERATING SYSTEM FROM A REMOTE COMPUTER

Figure 2A:
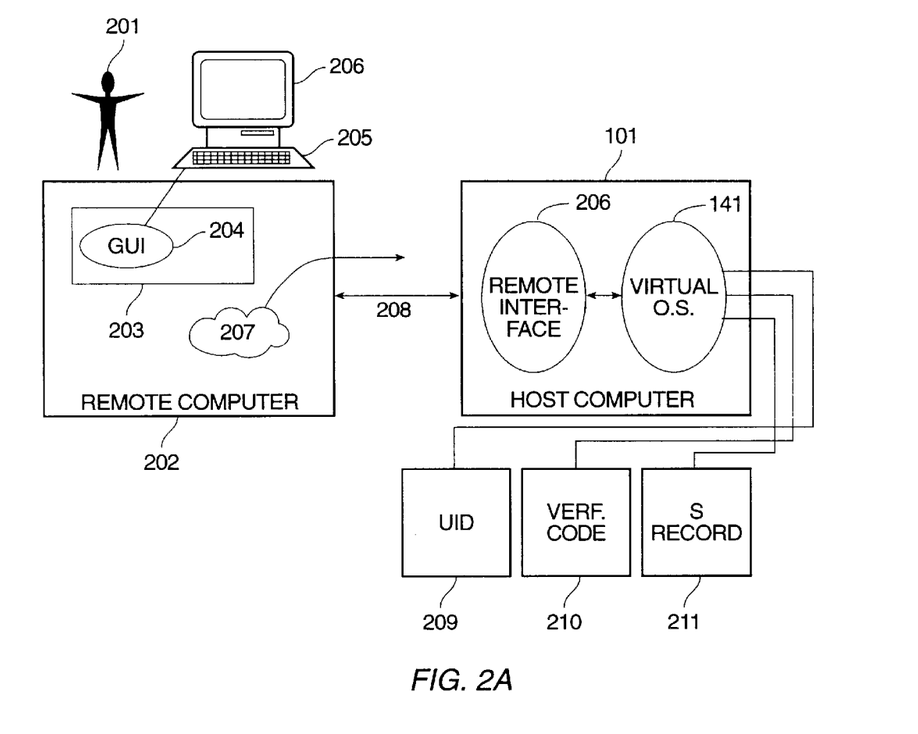
FIG. 2A is a block diagram showing use of a virtual application by a user remote from the host computer.
Figure 2B:
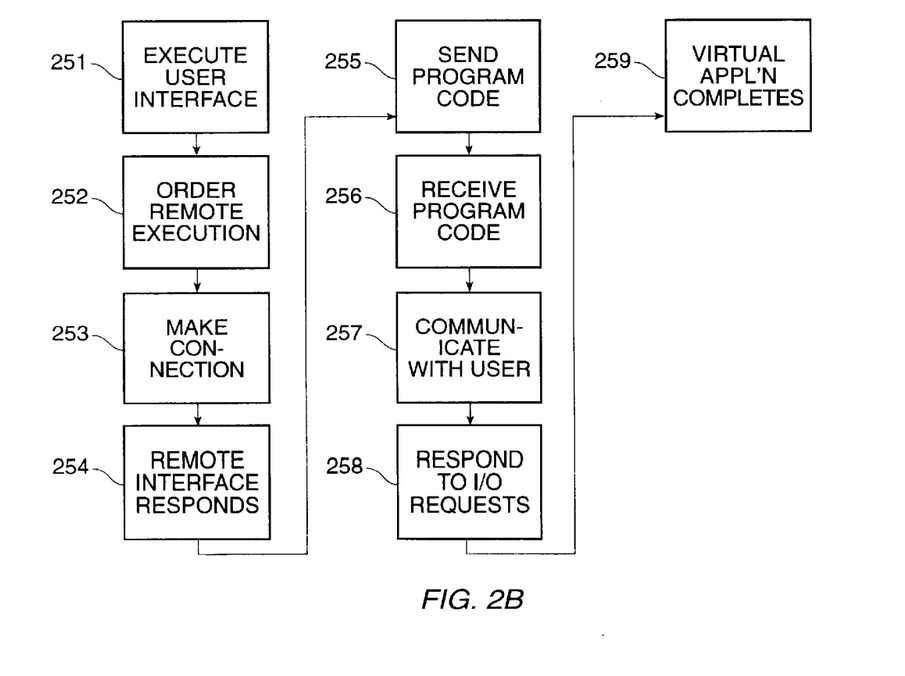
FIG. 2B is a flow diagram showing use of a virtual application by a user remote from the host computer.

FIG. 2A is a block diagram showing use of a virtual application by a user remote from the host computer. FIG. 2B is a flow diagram showing use of a virtual application by a user remote from the host computer.

At a step 251, a user 201, remote from the host computer 101 but having access to a remote computer 202, directs the remote computer 202 to execute a user interface 203. In a preferred embodiment, the user interface 203 comprises a graphical interface 204 that reads inputs from an input device 205 proximate to the user 201, and writes outputs to an output device 206 proximate to the user 201, for interaction with the user 201. The graphical interface 204 may also be configured to receive its inputs from and transmit its outputs to an application program 121 at the remote computer 202, for interaction with the user 201 by means of an intermediary application program 121.

At a step 252, the user 201 directs the user interface 203 to execute a selected set of program code 207 at a selected host computer 101.

At a step 253, the user interface 203 directs the remote computer 202 to make a connection 208, by means of the network 131 and a condign communication protocol, to the host computer 101.

At a step 254, the remote computer 202 and the host computer 101 cooperate to make the connection 208, by means of the network 131 and the communication protocol, between the remote computer 202 and the host computer 101. A receiving interface 206 at the host computer 101 waits for the connection 208 to be made, and responds to creation of the connection by listening for requests for service from the remote computer 202. The receiving interface 206 may be part of the virtual operating system 141, or may be a virtual application 143 executing under control of the virtual operating system 141.

At a step 255, the user 201 directs the remote computer 202 to send a set of program code 207 for a virtual application 143 to the host computer 101. The remote computer 202 sends the program code 207 to the host computer 101.

At a step 256, the receiving interface 206 at the host computer 101 receives the program code 207 and creates a virtual application 143. The language engine 191 interprets the program code 207 and executes the virtual application 143.

At a step 257, the virtual application 143 communicates with the user 201 by means of the GUI filter 171. The virtual application 143 makes requests to input from a virtual input device 172 and output to a virtual output device 173. The GUI filter 171 translates these requests into requests to input from and output to the connection 208.

At a step 258, the remote computer 202 responds to requests to input from and output to the connection 208. In general, the remote computer 202 responds to a request to input from the connection 208 by attempting to input from an input device 205 proximate to the user 201, and responds to a request to output to the connection 208 by attempting to output to an output device 206 proximate to the user 201.

As noted with regard to FIG. 1, the virtual application 143 may make other requests for service to the virtual application interface 144. The virtual application interface 144 transfers those requests to an associated resource filter 146, which duly scrutinizes them to determine if the virtual application 143 has virtual permissions 147 to satisfy the request. If so, the resource filter 146 translates the request for service into one or more requests for service from the operating system 103, by means of the application interface 111.

At a step 259, the language engine 191 reaches the end of the program code 207 and the virtual application 143 completes its operations. The virtual operating system 141 terminates any resources (virtual and real) given to the virtual application 143 and reports the termination of the virtual application 143 to the user 201.

Each copy of the virtual operating system 141 has a unique identifier 209 that may be used to determine whether the program code 207 (and virtual application 143) has virtual permissions 147 to be executed, and if so, what virtual resources 142 that virtual application 143 holds.

In a preferred embodiment, the virtual operating system 141 implements restricted proxies and capabilities of the Kerberos environment for authentication and reliable communication. The Kerberos environment is further described in B. Clifford Newman & Theodore Ts'o, "Kerberos: An Authentication Service for Computer Networks", IEEE Communications Magazine (September 1994), hereby incorporated by reference, and is available by inquiry from the authors of that article, or on the Internet.

Each copy of the virtual operating system 141 is self-verifying. The virtual operating system 141 comprises a verification code 210, comprising a checksum of the program code for the virtual operating system 141 itself. When verification is required, the virtual operating system 141 determines an actual checksum for itself and compares that value against the verification code 210. A virtual operating system 141 that fails to self-verify should preferably indicate so, to any user 201 requesting service.

The virtual operating system 141 maintains a record 211 of charges to be imposed on users 201 who request service, such as by requesting execution of a virtual application 143. The record 211 is determined in response to actual resources 122 and virtual resources 142 requested by the virtual application 143, and thus ultimately by the user 201. The record 211 may also reflect charges imposed by the host computer 201 or by the virtual application 143 itself for performing a selected service for the user 201, such as an advertising service, a banking service, a brokerage service, a financial service, or some other service. The virtual operating system 141 verifies the user 201 when a virtual application 143 is created. Verification of users 201 comprises requesting a password, or may comprise using an authentication method described in the paper on the Kerberos environment cited herein, and in papers cited therein.

In a preferred embodiment, the user interface 203 is integrated with the "Mosaic" program, and provides users 201 with a capability to execute programs by means of Mosaic. In a preferred embodiment, the user interface 203 is also integrated with other programs for accessing the World Wide Web, and provides users 201 with a capability to execute programs by means of access to documents in HTML format or a similar format.

Alternatively, the user interface 203 is provided by making a connection 208 to a selected communication port on the host computer 101, such as a selected socket of the "telnet" protocol. Thus, the user 201 makes a connection 208 by means of a "telnet" program to a selected socket at the host computer 101 (such as socket 9999 or some other selected socket). The operating system 103 at the host computer 101 couples that connection 208 either to an input to the language engine 191 or to a virtual application 143 executing under control of the virtual operating system 141 and programmed to operate as a server.

Although the user 201 is shown herein as being remote from the host computer 101, there is no requirement that "remote" means physically remote. In fact, the user 201 might be using a remote computer 202 that is nearby or collocated with the host computer 101. Alternatively, the user 201 may be using the host computer 101 itself as the remote computer 202, i.e., using a program on the host computer 101 to make a connection 208 to the host computer 101 to use the virtual operating system 141 on the host computer 101. In this case, the connection 208 may comprise a logical connection (such as an interprocess message) and need not be a physical connection (such as a network connection).

There is also no specific requirement for a user 201 to initiate action to execute the virtual application 143. The host computer 101 may execute virtual applications 143 under control of the virtual operating system 141, that have been scheduled by the virtual operating system 141 to be executed at selected times or in response to selected conditions.

For a first example, the host computer 101 may execute a virtual application 143 every day at a selected time, for gathering statistics on usage by other virtual applications 143 at the host computer 101. This virtual application 143 also requires no GUI filter 171 and no virtual input device 172 or virtual output device 173.

For a second example, the host computer 101 may execute a virtual application 143 that responds to requests at a selected telnet socket or requests that are transmitted by interprocess communication, either by other virtual applications 143 using the interprocess communication features of the virtual operating system 141 or by other applications 121 using the interprocess communication features of the operating system 103.

For a third example, the host computer 101 may execute a virtual application 143 that responds to selected conditions at the host computer 101, such as a virtual application 143 that deletes older virtual files 163 when the virtual file system 162 is suffering from excess use.

THE DISTRIBUTED EXECUTION ENVIRONMENT

Figure 3A:
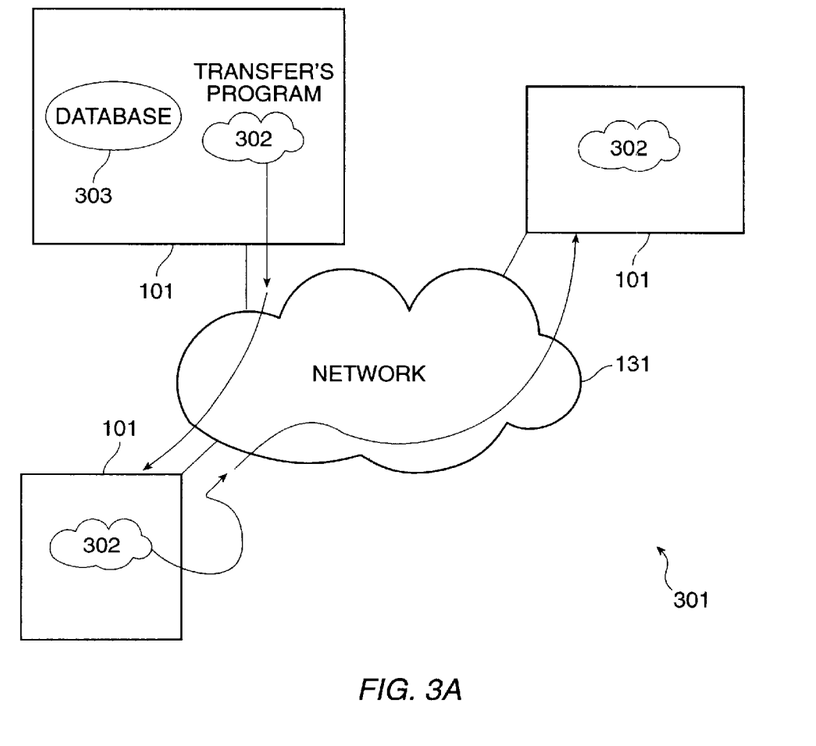
FIG. 3A is a block diagram showing an execution environment with multiple host computers.
Figure 3B:
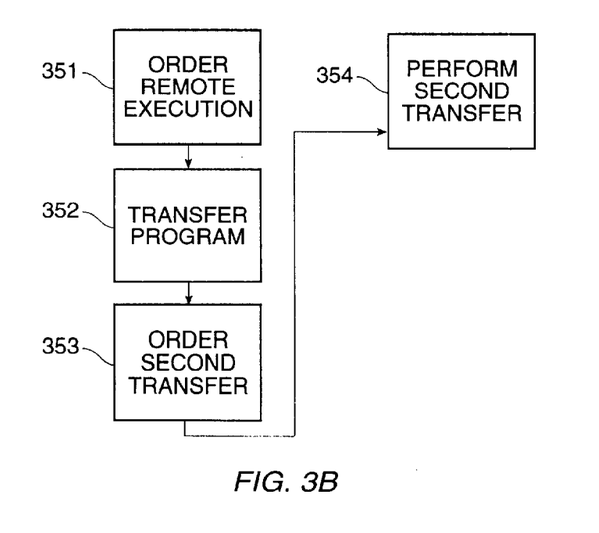
FIG. 3B is a flow diagram showing use of an execution environment with multiple host computers by a user at one such host computer.

FIG. 3A is a block diagram showing an execution environment with multiple host computers. FIG. 3B is a flow diagram showing use of an execution environment with multiple host computers by a user at one such host computer.

An execution environment 301 comprises a set of host computers 101 coupled to a network 131. As described with regard to FIG. 1, each host computer 101 has a set of computer hardware 102 controlled by an operating system 103. In general, each set of computer hardware 102 may differ from each other, and each operating system 103 may also differ from each other. As described with regard to FIG. 1, each host computer 101 comprises a network interface 132 coupled to the network 131 and controlled by the operating system 103 for that host computer 101.

Although the execution environment 301 is shown to have a set of host computers 101, there is no particular requirement that the execution environment 301 is limited to host computers 101 executing the virtual operating system 141. A program (such as a transferable program 302 described herein) may be invoked by a user 201 either at a host computer 101 having a virtual operating system 141, at a host computer 101 without a virtual operating system 141, or at a host computer 101 which has a virtual operating system 141 but which refuses to execute transferable programs 302 for users 201.

The execution environment 301 comprises a virtual operating system 141 associated with each host computer 101. As described with regard to FIG. 1, each virtual operating system 141 comprises a virtual application interface 144 and a language engine 191. In general, each virtual application interface 144 must be substantially uniform, except possibly for differences imposed by resource limitations, such as a maximum number of virtual processes 153 or a maximum size of virtual files 163. Each selected language must be uniform for all language engines 191 that interpret that selected language. This may require that the implementation of each virtual operating system 141 is tailored to its own particular host computer 101.

At a step 351, similar to the steps 251 and 252, a user 201, having access to a client host computer 101, directs the client host computer 101 to execute the user interface 203 and execute a transferable program 302 (comprising selected program code 207) at a server host computer 101. In a preferred embodiment, the user interface 203 may be executed at the behest of an application program 121 at the user's host computer 101, such as an application program 121 executed by the user 201 at a scheduled time.

At a step 352, similar to the steps 253, 254, 255, and 256, the user interface 203 at the client host computer 101 directs the virtual operating system 141 at the server host computer 101 to execute the transferable program 302, and the virtual operating system 141 at the server host computer 101 complies (to the extent of virtual permissions 147 held by the transferable program 302).

The transferable program 302 comprises either an actual program that is interpretable by a language engine 191, or a name in a name space at the server host computer 101 that designates an actual program that is interpretable by its language engine 191. It is not necessary that the transferable program 302 must be actually transferred each time, such as if there is a copy of that transferable program 302 already at the server host computer 101.

The server host computer 101 can be assured that the transferable program 302 will not violate constraints set by the server host computer 101 (such as by its owner or administrator), because the language engine 191 directs all requests for service to the virtual operating system 141. The owner or administrator of the server host computer 101 details the constraints on resources the server host computer 101 will make available to virtual applications 143, such as limits on processor time or processor loading, processor memory space, or file system space. The virtual operating system 141 provides a method of administrative access to set these constraints, such as a set of permissions for setting constraints which are available only to a selected set of users 201 (who are not necessarily local to the server host computer 101).

In a preferred embodiment, the user interface 203 selects the server host computer 101 in response to a set of preferences selected by the user 201 and in response to a database 303 of server host computers 101 available at the client host computer 101. The database 303 is periodically updated by the user interface 203 (or another application program 121 at the client host computer 101) in response to information from a set of server host computers 101. Typically, the user interface 203 maintains a database of information about server host computers 101 such as connection bandwidth, expense, and processor loading, and dynamically selects a server host computer 101 to execute the transferable program 302 at the time that execution is requested.

The user interface 203 is integrated with other network protocols available at the host computer 101, so that for example, documents in Gopher or HTML format may comprise entries that, when selected, cause one or more transferable programs 302 to be executed.

In a preferred embodiment, the transferable program 302 comprises elements of the user interface 203 (or is able to access a user interface 203 on the server host computer 101), and is thus able to direct the execution of further transferable programs 302 at further host computers 101, using the server host computer 101 as a new client host computer 101.

At a step 353, similar to the step 351, the transferable program 302, executing at a first server host computer 101, directs the first server host computer 101 to execute the user interface 203 and execute the transferable program 302 itself (or another transferable program 302) at a second server host computer 101.

At a step 354, similar to the step 352, the user interface 203 at first server host computer 101 directs the virtual operating system 141 at the second server host computer 101 to execute the transferable program 302, and the virtual operating system 141 at the server host computer 101 complies (to the extent of virtual permissions 147 held by the transferable program 302).

In a first example, the transferable program 302 executes on a first server host computer 101 and searches for a selected resource 122 at that server host computer 101, such as a file or file system object 107 with a selected name. If the file or file system object 107 is found at that server host computer 101, the transferable program 302 reports the location of the file or file system object 107 to the user 201 and terminates; if the file or file system object 107 is not found at that server host computer 101, the transferable program 302 selects another server host computer 101 and transfers itself thereto, where it continues the search.

In a second example, the transferable program 302 executes on a first server host computer 101 and gathers data for statistical compilation, such as a set of usage data. After gathering the data at one server host computer 101, the transferable program 302 selects another server host computer 101 and transfers itself thereto, where it continues to gather data. This transferable program 302 is well suited to constructing and using multihost databases and multihost database servers.

It would be apparent to those skilled in the art, after perusal of this application, that implementation of other and further transferable programs 302, with other and further functions, would not require undue invention, and would be within the scope and spirit of the invention. For example, a distributed application may comprise more than one transferable program 302, or more than one copy of a single transferable program 302, that executes on more than one host computer 101 and operates on more than one file system 105, to achieve a result in the distributed execution environment, possibly for a plurality of users 201.

Although a multihost distributed environment is shown in which virtual operating systems 141 cooperate, there is no particular requirement that there is any one virtual operating system 141, or any one other program, that directs virtual operating systems 141 throughout the execution environment 301 or some subset of the execution environment 301. Each virtual operating system 141 remains independent and need not accept direction from others.

Alternative embodiments

Although preferred embodiments are disclosed herein, many variations are possible which remain within the concept, scope, and spirit of the invention, and these variations would become clear to those skilled in the art after perusal of this application.

I claim:

1. A system including a first operating system disposed for controlling a set of first computer hardware, said first operating system including a first application interface disposed for receiving first requests for first services from a plurality of first application programs and being disposed for maintaining independent first state information for each one of said plurality of first application programs, said first state information including a locus of execution and an address space, said first operating system disposed for operating on a set of first operating system resources in response to said first requests for services;

a second operating system disposed for controlling a set of second computer hardware, said second operating system including a second application interface disposed for receiving second requests for second services from a plurality of second application programs and being disposed for maintaining independent first state information for each one of said plurality of second application programs, said second state information including a locus of execution and an address space, said second operating system disposed for operating on a set of second operating system resources in response to said second requests for services;

wherein said first computer hardware, first application interface, and first operating system resources substantially differ from said second computer hardware, second application interface, and second operating system resources;

a third operating system disposed for controlling a set of said first operating system resources, said third operating system including a third application interface disposed for receiving requests for third services from a plurality of third application programs and being disposed for maintaining independent third state information for each one of said plurality of third application programs, said third operating system disposed for operating on a set of third operating system resources in response to said requests for third services; and a fourth operating system disposed for controlling a set of said second operating system resources, said fourth operating system including a fourth application interface disposed for receiving requests for fourth services from a plurality of fourth application programs and being disposed for maintaining independent fourth state information for each one of said plurality of fourth application programs, said fourth operating system disposed for operating on a set of fourth operating system resources in response to said requests for fourth services;

wherein said third application interface substantially equates to said fourth application interface.

2. A system as in claim 1, wherein said first operating system includes a file system having a set of data persisting beyond termination of said first operating system, said second operating system, or said first application programs.

3. A system as in claim 1, wherein said second operating system includes a file system having a set of data persisting beyond termination of said first operating system, said second operating system, or said second application programs.

4. A system as in claim 1, wherein said first operating system includes a first file system, second operating system each includes a second file system, and said first and second file systems are substantially different.

5. A system as in claim 1, wherein said first operating system includes a first protection domain, said second operating system includes a second protection domain, and said first and second protection domains are substantially different.

6. A system as in claim 1, including a third application program including instructions for making requests for third services from said third operating system;

a communication path disposed for coupling said third application program to said second computer hardware to dispose a fourth application program thereon;

whereby said third application program substantially equates to said fourth application program.

7. A system as in claim 1, including a third application program including instructions for making requests for third services from said third operating system;

a fourth application program including instructions for making requests for fourth services from said fourth operating system;

wherein said third application program substantially equates to said fourth application program.

* * * * *